United States Patent Office 3,438,940
Patented Apr. 15, 1969

3,438,940
PROCESS OF PREPARING WATER DISPERSIBLE POLYURETHANES AND RESULTING PRODUCT
Wolfgang Keberle, Bergisch Neukirchen, and Dieter Dieterich, Leverkusen, Germany, assignors to Farbenfabriken Bayer Aktiengesellschaft, Leverkusen, Germany, a corporation of Germany
No Drawing. Filed Mar. 24, 1966, Ser. No. 536,956
Claims priority, application Germany, Apr. 3, 1965, F 45,718
Int. Cl. C08g 22/04
U.S. Cl. 260—67    6 Claims

ABSTRACT OF THE DISCLOSURE

Water dispersible polyurethanes are prepared by reacting a polyurethane having a molecular weight of 5000–2,000,000 with an aldehyde and an alkali metal sulphite, hydrosulphite, aminocarboxylate or amino sulphonate at a temperature of about 0° to 150° C. The products are useful for coating and impregnating textiles, leather and the like or for use as antistatic and crease resistant finishes.

This invention relates to polyurethanes and more particularly to improved water dispersible polyurethanes.

Polyurethane resins without ionic groups are hydrophobic synthetic resins which when in solution in organic solvents are incompatible with water or with aqueous solutions or dispersions. Polyurethane resins having ionic groups, which are compatible with water or aqueous solutions or aqueous dispersions or can be diluted or mixed with them, are therefore of special interest.

It has been proposed heretofore to prepare polyurethane latex where the polyurethane is made water dispersible with the aid of an emulsifier or by the incorporation of tertiary nitrogen atoms which can be quaternated. Furthermore, it has been known heretofore to react an —NCO terminated prepolymer with a dicarboxylic acid and then react the remaining acid groups with a base such as sodium hydroxide to form a salt which is water soluble. This heretofore known method, however, results in products which are either not compatible with alkalies due to the presence of the quaternated tertiary nitrogen atoms, which are subject to the use of large amounts of emulsifying agents in order to produce a stable dispersion or in the latter case where the sodium salt is formed the chain is terminated and the reactive site is lost. It would, therefore, be desirable to have a polyurethane polymer which could be dispersed in water without an emulsifier and which would be compatible with alkalies and compounds that split off bases.

It is, therefore, an object of this invention to provide for the preparation of water dispersible polyurethanes which are free of the foregoing disadvantages. Another object of this invention is to provide for water dispersible polyurethanes, as well as a method for the preparation thereof, which are compatible with alkalies. Still another object of this invention is to provide a method of incorporating salt-like groups into previously prepared polyurethanes without destruction of the —NCO groups which are present. Still a further object of this invention is to provide for the preparation of polyurethane polymers having salt-like groups which are essentially the same functionality with regard to —NCO groups as was present before the modification to include salt-like groups. Another object of this invention is to provide improved substantially linear polyurethane polymers which are water dispersible and can be shaped and cross-linked without additional chain extension reactants.

The foregoing objects and others which will become apparent from the following description are accomplished in accordance with the invention, generally speaking, by providing for the production of polyurethane resins including foils, coatings and adhesives based on predominantly linear polyurethane compositions having a molecular weight of about 500 to about 2,000,000 and prepared from compounds having at least two reactive hydrogen atoms and a molecular weight of about 300 to about 10,000, organic polyisocyanates and, if desired, chain lengthening agents with at least two reactive hydrogen atoms, and modifying these polyurethane compositions by introducing anionic groups which impart hydrophilic properties to the intrinsically hydrophobic polyurethanes and bring about the compatibility, dilutability and miscibility with water, aqueous solutions and aqueous dispersions. The modification of the compositions is provided by reacting them with aliphatic or aromatic aldehydes and either at the same time or subsequently with a metal sulphite, metal hydrosulphite, metal aminocarboxylate or metal aminosulphonate at temperatures between about 0° C. and about 150° C.

If the process is carried out in solvents which may contain a proportion of water, the polyurethane masses present in solution may subsequently be treated with water and if desired the organic solvent may be completely or partly removed, and according to the degree of hydrophilicity of the salt type polyurethane, aqueous or water-containing solutions, dispersions or pasty masses are obtained which dry to form non-sticky foils, sticky masses or thermoplastic powders. The predominantly linear polyurethane masses may in the course of the process be cross-linked with polyfunctional substances which have a cross-linking action.

Any suitable organic compound containing active hydrogen containing groups as determined by the Zerewitinoff method may be used for the preparation of the initial polyurethane. These compounds preferably have a molecular weight of about 300 to about 10,000, most preferably 500 to 4000, and are preferably mainly linear. The compounds are preferably those having hydroxyl, carboxyl, amino or mercapto groups. The most preferred being polyhydroxyl compounds such as hydroxyl polyesters, polyacetals, polyethers, polythioethers, polyamides, polyester amides and the like.

Suitable polyethers are, for example, the condensation products of ethylene oxide, propylene oxide, tetrahydrofuran, butylene oxide and copolymerization or graft polymerization products thereof such as, for example, mixed ethylene oxide, propylene oxide condensates as well as products prepared by reacting olefins under high radiation with the alkylene oxide condensates to prepare graft polymerization products. Polyethers are suitable which are prepared by condensation of the aforementioned alkylene oxides with polyhydric alcohols such as ethylene glycol, 1,2-propylene glycol, 1,4-butane diol, glycerine, trimethylolpropane, pentaerythritol and the like. It is preferred, however, to use essentially difunctional compounds although one may use amines such as N-diethanol amine, polyamines such as ethylene diamine, and amino alcohols such as ethanol amine, preferably, however, in minor amount. Suitable polyacetals are the compounds which can be prepared from hexane diol and formaldehyde. The polythioethers are, for example, condensation products of thiodiglycol either alone or in admixture with other glycols such as ethylene glycol, propylene glycol, or other polyhydroxy compounds specifically disclosed above. Any suitable polyester which is preferably saturated may be used, including the polyester amides and polyamides obtained, for example, from poly-basic saturated or unsaturated polycarboxylic acids and polyhydric saturated or unsaturated alcohols, diamines, polyamines and the like. Any suitable carboxylic acid may be used such as, for example, adipic acid, succinic acid, phthalic acid, terephthalic acid, maleic acid and the like. Any suitable alcohol may be used such as, for example, ethylene glycol, propylene glycol, butylene glycol, neopentyl glycol, hexane diol, trimethylolpropane and the like. Any suitable amino alcohol may be used such as ethanol amine, any suitable diamine may be used such as, ethylene diamine, hexamethylene diamine and the like. Polyhydroxyl compounds which already contain urethane or urea groups as well as natural polyols which may be further modified if desired such as castor oil, carbohydrates and the like may also be used.

It is possible especially for the purpose of varying the hydrophilic or hydrophobic character and mechanical properties of the product to use mixtures of different polyhydroxyl compounds.

Any suitable organic polyisocyanate may be used including both aliphatic and aromatic polyisocyanates and preferably diisocyanates such as, for example, 1,5-naphthylene diisocyanate, 4,4'-diphenylmethane diisocyanate, 4,4'-diphenyldimethylmethane diisocyanate, di- and tetra-alkyldiphenylmethane diisocyanate such as 2,2'-dimethyl-4,4'-diphenylmethane diisocyanate, 2,2',3,3'-tetramethyl-4,4'-diisocyanato diphenylmethane and the like; 4,4'-dibenzyldiisocyanate, 1,3-phenylene diisocyanate, 1,4-phenylene diisocyanate, 2,4-toluylene diisocyanate, 2,6-toluylene diisocyanate, mixtures of 2,4- and 2,6-toluylene diisocyanate, 2,6-dichloro-1,4-phenylene diisocyanate, 2,2'-dichloro-4,4'-diisocyanato diphenylmethane, 2,4-dibromo-1,5-diisocyanato naphthalene, phosphorous containing isocyanates such as phenyl di-(4-isocyanato phenyl)-phosphate, butane-1,4-diisocyanate, hexane-1,6-diisocyanate, dicyclohexyl methane-4,4'-diisocyanate, cyclohexane-1,4-diisocyanate and the like. Of particular interest are partly masked isocyanates which enable the resulting product containing salt-like groups to be cross-linked by simply heating it to a higher temperature. Isocyanates which may be used for this purpose are for example, dimeric-2,4-toluylene diisocyanate as well as polyisocyanates which have had their —NCO groups blocked with phenol, tertiary butanol, phthalimide, caprolactam and the like.

The prepolymer having free —NCO groups which results from the reaction of the organic compound containing active hydrogen containing groups as determined by the Zerewitinoff method and the organic polyisocyanate may, if desired, be further extended with an additional active hydrogen containing compound which preferably has a molecular weight below about 500. Suitable compounds of this type include, for example, alcohols, preferably glycols, amines, preferably diamines, amino alcohols, dicarboxylic acids, amino carboxylic acid and the like.

Any suitable alcohol may be used especially saturated or unsaturated glycols such as ethylene glycol or condensates thereof such as diethylene glycol, triethylene glycol or the like, 1,4-butane diol, propane-1,2-diol, propane-1,3-diol, neopentyl glycol, dihydroxy ethoxy hydroquinone, 1,4-butane diol, dihydroxy ethyl diane, mono- and di-alkoxylated aliphatic, cycloaliphatic, aromatic and heterocyclic primary amines, such as N-methyl diethanolamine, N,N-bis-gamma-amino-propyl - N - methylamine, N-oleyl diethanol amines, N-cyclohexyl diisopropanol amine, N,N-dihydroxy ethyl-p-toluidine, N,N-dihydroxypropylnaphthylamine, polypropoxylated-n-butyl diethanol amines such as the reaction product of N-butyl diethanol amine with two mols of ethylene oxide, polypropoxylated N-methyl diethanolamines having a molecular weight of 300 to about 4000, polyesters having tertiary amino groups such as the reaction product of two mols of N-methyl diethanol amine with one mol of adipic acid, dimethyl-bis-oxyethyl hydrazine and the like.

The diamine chain extenders may be any suitable aliphatic, cycloaliphatic or aromatic diamine such as, for example, ethylene diamine, hexamethylene diamine, 1,4-cyclohexylene diamine, benzidine-4,4'-diamino diphenylmethane, the isomers of phenylene diamine such as 1,4-phenylene diamine, 1,2-phenylene diamine and the like as well as hydrazine, ammonia and the like.

Any suitable amino alcohol may be the chain extender such as ethanolamine, propanolamine, butanolamine or the like.

Any suitable carboxylic acid may be the chain extender such as aliphatic, cycloaliphatic, aromatic and heterocyclic dicarboxylic acid such as oxalic acid, malonic acid, succinic acid, glutaric acid, adipic acid, pimelic acid, suberic acid, azelaic acid, sebacic acid, terephthalic acid, 1,4-phenylene dicarboxylic acid, diphenic acid, the isomeric naphthalic acid such as 1,5-dicarboxylic naphthalic acid, maleic acid, fumaric acid, sulphodiacetic acid, diglycollic acid, thiodiglycollic acid, methylene-bis-thioglycollic acid, the isomeric pyridocarboxylic acids such as quinolinic acid, lutidinic acid and other isomeric quinolinodicarboxylic acids and the like.

Any suitable amino carboxylic acid may be the chain extending agent such as, for example, aliphatic, cycloaliphatic, aromatic or heterocyclic amino carboxylic acids such as glycine, alpha, and beta-alanine, 6-aminocaproic acid, 4-aminobutyric acid, the isomeric amino benzoic acids, p-amino benzoic acid, the isomeric amino naphthoic acids such as 5-aminonaphthoic acid and the like.

The production of the polyurethane masses may be carried out in known manner with or without solvent. Preferably a preadduct is first prepared from the higher molecular weight organic compound having active hydrogen atoms and the polyisocyanate, with or without solvent, preferably at about 100 to about 150° C. and this preadduct is then further reacted at about 20 to about 150° C., if desired in solution, with any chain lengthening agents that may be used. Alternatively, the polyhydroxyl compound may first be mixed with the chain lengthening agents. The reaction may be carried out in the presence of catalysts such as tertiary amines and/or organometallic compounds. The molecular ratio of isocyanate groups to reactive hydrogen atoms preferably lies between about 0.4:1 and 1.5:1, preferably between about 0.9:1 and 1.2:1.

According to a special method of carrying out the process of the invention, polyurethane masses which contain free primary and/or secondary hydroxyl- and/or amino groups are used as starting materials. This special type of polyurethane mass may be produced, for example by carrying out the isocyanate reaction with considerably less than the equivalent quantity of isocyanates, thereby obtaining short chained polyurethane masses with terminal polyhydroxyl groups. An alternative preferred method is to use chain lengthening agents having more than two hydroxyl groups. If polyurethane masses having two primary or secondary amino groups are required, it is possible to start, for example, from polyhydroxyl compounds which already have such amino groups incorporated in them by condensation, in other words, polyester amides and polyamides. In this case it is also more suitable to use higher functional chain lengthening agents. Examples of such higher functional chain lengthening agents, which may be used alone or as only part of the total quantity of chain lengthening agents are: diethylene triamine, triethylene tetramine, tetraethylene pentamine, pentaethylene hexamine, hexaethylene heptamine, glycerol, erithritol, mesoerythritol, arabitol, adonitol, xylitol, mannitol, sorbitol, dulcitol, 1,3-diaminoisopropanol, 1,2-diaminopropanol, tris-hydroxymethyl-aminomethane. 2-amino-2-methyl-1,3-propane diol, 2-amino - 2 - ethyl-1,3-propane diol, 2-amino-1,3-propane diol and the monohydroxy alkylated polyamines such as N-hydroxyethyl-ethylene diamine, N-hydroxyethyl hydrazine, N-hydroxyethyl-hexamethylene diamine.

According to the invention, the known polyurethane compounds are reacted with aliphatic or aromatic aldehydes and with reactive, salt-type compounds, namely metal sulphites, metal hydrogen sulphites, metal aminocarboxylates or metal aminosulphonates.

The aldehydes includes for example formaldehyde, acetaldehyde, propionaldehyde, butyraldehyde, isobutyraldehyde, valeric aldehyde, benzaldehyde which may, if desired by substituted, salicylic aldehyde, vanilline, hexahydrobenzaldehyde and the like.

The following are specific examples of suitable salt-type compounds:

(1) Metal sulphites such as lithium-, sodium- and potassium sulphite, (2) Metal hydrogen sulphites such as lithium-, sodium- and potassium hydrogen sulphite, (3) The lithium-, sodium- and potassium salts of aliphatic, cycloaliphatic, aromatic and heterocyclic amino-, mono- and dicarboxylic acids such as glycine, alpha- and beta-alanine, 4-aminobutyric acid, 6-aminocaproic acid, aspartic acid, glutamic acid, the isomeric aminobenzoic acids, isomeric amino phthalic acids, isomeric amino naphthoic and naphthalic acids, the addition products of acrylic acid with ammonia and primary amines, and saponified addition products of acrylonitrile with ammonia and primary amines, (4) Lithium-, sodium- and potassium salts of aliphatic, cycloaliphatic, aromatic and heterocyclic amino-, mono- and disulphonic acids such as taurine, the addition products of sultones, such as propane sultone, butane sultone and naphthosultone-1,8, and unsaturated sulphonic acids such as vinyl sulphonic acid, styrene sulphonic acid or their alkali metal salts with ammonia and primary aliphatic, aromatic, cycloaliphatic and heterocyclic amines, sulphanilic acid, metanilic acid, the isomeirc aminobenzoic disulphonic acids and the isomeric aminonaphthalic- mono- and disulphonic acids, (5) The lithium-, sodium- and potassium salts of amido sulphonic acid, (6) The lithium-, sodium- and potassium salts of hydroxymethyl sulphoxylic acid.

Formaldehyde is especially suitable as the carbonyl compound and sodium sulphite, sodium hydrogen sulphite or taurine sodium as reactive, salt-type compounds. The preferred metals are those of Group 1 of the Periodic Table.

According to one method of carrying out the process, the polyurethane mass, contained in a solvent miscible to an extent of preferably at least 10% with water, such as ketones, alcohols, acetone, tertiary butanol, methanol, ethanol, isopropanol, acetonitrile, tetrahydrofuran or dioxane, is first treated with the aldehyde dissolved in water, an alcohol or a ketone and is reacted at temperatures preferably between about 0° and about 100° C., the pH preferably being adjusted by the addition of alkalies such as aqueous sodium hydroxide, aqueous potassium hydroxide, ammonia, sodium- and potassium carbonate, sodium hydrogen carbonate, sodium, acetate, borax, magnesium oxide or aliphatic amines to a value which ensures smooth reaction. It is preferred to maintain the pH between 7 and 9. The controlled course of the reaction of polyurethanes with carbonyl compounds such as formaldehyde is surprising since polyurethanes are known to undergo cross-linking with formaldehyde and ionic polyurethanes cross-link especially easily.

Carrying out the reaction in an alkaline medium prevents the occurrence of cross-linking reactions released by formaldehyde which would set in immediately if the reaction of the polyurethane with formaldehyde were carried out in an acid medium.

The reactive, salt-type compound is then added, dissolved in a suitable solvent such as water, and the reaction is completed by stirring the reaction mixture at about 0° to about 100° C. A polyurethane mass with salt-type groups is thus obtained.

According to another method of carrying out the process, the carbonyl component and the reactive salt-type component may together be added to the polyurethane mass. Separate addition of alkalies or alkaline substances to maintain a pH about 7 is then not necessary. The mixture preferably contains the components in the ratio of 1:1.

In general, the carbonyl components and the reactive salt-type compound are preferably used in molar ratios between about 2:1 and about 1:2.

The solvent present may be removed at room temperature or elevated temperature, and this operation may, if desired, be accompanied by a process which shapes the product, or the solvent may be diluted with water or partly or completely replaced by water. The conversion of the polyurethane mass into the aqueous phase may be carried out by other procedures in which the organic polyurethane solution is introduced with vigorous stirring into the given quantity of water and the organic solvent is removed at the same time or subsequently, if desired in a vacuum, and the dissolved or liquid polyurethane mass free from solvent is injected into the water, e.g. from nozzles under pressure.

Ultrasonic vibrations may be used for achieving a suitable state of distribution in the aqueous phase.

Care should be taken during the preparation of the polyurethane mass used as starting material that no solvent is used which contains functional groups which would react with isocyanate groups under the reaction conditions. In the actual process according to the invention, one may use any solvent which does not enter into reaction with the polyurethane mass, the carbonyl compounds used and the reactive, salt-type compounds used. Preferred solvents are hydrocarbons which may, if desired, be halogenated, ketones, alcohols, esters and nitriles, examples of such solvents including acetone, methyl ethyl ketone, methanol, alcohol, isopropanol, tertiary butanol, acetonitrile, ethyl acetate, methylene chloride, chloroform, carbon tetrachloride, dimethylformamide and dimethylsulphoxide. A particularly suitable solvent for the carbonyl component and the reactive, salt-type compound is water.

The aqueous or aqueous-organic solutions or dispersions obtained are stable without the addition of emulsifier but appropriate anionic or neutral emulsifiers or dispersing agents may be added, such as ammoniacally casein, fatty alcohol sulphonates and sulphates, polyvinyl alcohol, hydroxyethylated alkyl phenols, polyglycol ethers of oleyl alcohol or natural products such as gelatine, gum arabic, tragacanth, fish glue, agar-agar or salts of resinic acid.

The anionically modified polyurethanes may be blended or mixed with dispersions or solutions of the same charge, e.g. dispersions or solutions of polyvinyl chloride, polyethylene, polystyrene, polybutadiene and copolymer resins, aqueous solutions of resin-forming condensation products which contain sulphonic acid groups or sulphonate groups, such as phenolformaldehyde resins, urea formaldehyde resins, malamine formaldehyde resins, ethylene urea formaldehyde resins, alcohol modified aminoplasts and condensates which may contain as components e.g. formaldehyde, phenol, melamine, urea, ethylene urea and compounds having a triazine ring, water soluble or water dispersible polyepoxides and di- and polyepoxides obtainable by condensation of epichlorohydrin with polyhydric alcohols such as glycols or glycerol.

Finally, fillers plasticisers, pigments, sols of carbon black and of silicic acid, aluminium, clay and abestos dispersions may be incorporated in the anionically modified aqueous or aqueous organic polyurethane products.

The products of the process may be subjected to a forming process in the presence of known cross-linking agents. For this purpose, polyfunctional cross-linking agents may be added to the polyurethane masses in the course of the process, these agents effecting chemical cross-linking at room temperature or elevated temperature, if necessary after removal of the solvent by evaporation. Examples of such cross-linking agents are sulphur, formaldehyde and compounds which give off formaldehyde or react like formaldehyde, free or partially or completely masked polyisocyanates, carbodiimides, polyamines, compounds of divalent or polyvalent metals such as oxides, carbonates or hydroxides of calcium, zinc or magnesium or organic and inorganic peroxides.

The cross-linking agents, fillers, pigments, blending agents and other additives, which may be present in solution or suspension, may be added in the course of the process to the polyurethane masses which may be dissolved or dispersed in an organic solvent or in water, or alternatively these agents may be added to the polyurethane masses on mixing rollers.

Compared with unmodified polyurethanes, the products of the process are distinguished by greater hydrophilicity, greater water uptake capacity, better resistance to solvents and better dyeability.

The possibility of bringing polyurethanes differing widely in their composition into a suitable form for further use opens up many new possibilities of application. Thus, it is possible to produce dip-moulded articles, or foam plastics by the latex churning process or, by the addition of electrolyte to the aqueous solutions and dispersions, it is possible to produce coagulates which can be worked up on mixing rollers like solvent-free polyurethane masses, and by evaporating off any solvent present, it is possible to obtain non-sticky or sticky films and foils and crystalline powders. The products of the process are suitable for coating and impregnating woven or non-woven textiles, leather, paper, wood or metals or for use as antistatic and crease-resistant finishes and as binders for fleeces, as adhesives, adhesifying agents, backing agents, hydrophobing agents, plasticizers, binders e.g. for cork dust or sawdust or for glass fibres, asbestos, paper type materials, plastics or rubber waste or ceramic materials, and as adhesifying agents in textile printing and in the paper industry, as additives to polymer dispersions, as sizing agents and for leather dressings.

The invention is further illustrated by the following examples in which parts are by weight unless otherwise specified.

Preparation of starting materials

A. About 218.5 grams of a polyester of adipic acid, 1,5-hexanediol and neopentyl glycol (OH number 63) are reacted with about 42.0 grams of 1,6-hexanediisocyanate after about ½ hour's dehydration at about 120° C. and 12 mm. Hg, and the reactants are then kept for about 2 hours at about 120° C. After dissolving the melt in about 1 liter of tertiary butanol, the solution is added dropwise at 25° C. into a solution of about 7.52 grams ethylene diamine in about 1 liter of tertiary butanol. The mixture is then stirred for about ½ hour. After termination of the reaction, the polyurethane mass is free from solvent in vacuo.

B. About 218.5 grams of a polyester of adipic acid, 1,6-hexanediol\ and neopentyl glycol (OH number 63) are dehydrated at about 120° C. and 12 mm. Hg for about 30 minutes. By the addition of about 63.0 grams of 1,6-hexane diisocyanate, an adduct is prepared at about 120° C. in the course of about 2 hours and after cooling, it is dissolved in about 1 liter of tertiary butanol. The adduct solution is added slowly at room temperature to about 15.0 grams of ethylene diamine in about 1 liter of tertiary butanol. After about ½ hours stirring, the reaction is terminated. The solvent is distilled off in vacuo.

EXAMPLE 1

About 268 grams of polyurethane mass A are dissolved in about 750 ml. of tertiary butanol and treated with a mixture, which has been heated for about 30 minutes at about 55° C., of about 12.5 grams of a 30% aqueous formaldehyde solution and about 32.5 grams of a 40% aqueous sodium hydrogen sulphite solution and about 50 ml. of water. After about 5 hours heating at about 55° C., about 600 ml. of water are slowly added. The organic solvent is largely removed by evaporation in vacuo. The sodium polyurethane sulphonate dispersion obtained by sulphomethylation can be diluted with water.

EXAMPLE 2

About 268 grams of polyurethane mass A are dissolved in about 1500 ml. of tertiary butanol and adjusted to pH 9 with 10% aqueous sodium hydroxide solution. After the addition of about 25 grams aqueous 30% formaldehyde solution, the reaction mixture is stirred for about 2 hours at about 70° C. under constant control of the pH and further addition of sodium hydroxide solution. After the addition of about 32.5 grams of 40% aqueous sodium hydrogen sulphite solution, the mixture is stirred for about one hour at about 70° C. while the pH is maintained at 7, and the organic solvent is largely distilled off. About 600 ml. of water are added slowly to the remaining solution with stirring. The aqueous organic dispersion of the anionically modified polyurethane can readily be mixed with anionic polymer dispersions based on acrylic acid, methacrylic acid, esters of such acids, butadiene, styrene and other comonomers.

EXAMPLE 3

The procedure given in Example 1 is carried out but using about 12.5 grams of 30% aqueous formaldehyde solution and about 15.75 grams of 40% sodium hydrogen sulphite solution. After about 3 hours reaction at about 50° C. while the pH is maintained at about 7–8 by the addition of 10% aqueous sodium hydroxide solution, the reaction mixture is concentrated by evaporation in vacuo and treated with about 600 ml. of water. The anionic polyurethane is coagulated by the addition of aqueous hydrochloric acid but is readily compatible with aqueous ammonia solution.

EXAMPLE 4

About 296 grams of polyurethane mass B are dissolved in about 1500 ml. of tertiary butanol and treated with a mixture of about 37.5 grams of 30% aqueous formaldehyde solution and about 97.5 grams of 40% aqueous sodium hydrogen sulphite solution at room temperature. The reaction mixture is heated to about 60° C. and adjusted to pH 8 by the addition of ammonia. After about 2 hours at about 55° C., the solution is concentrated by evaporation and about 600 ml. of water are slowly added. The polyurethane dispersion is coagulated by the addition of about 150 grams calcium chloride in about 300 ml. water.

EXAMPLE 5

A mixture of about 18.8 grams 30% aqueous formaldehyde solution and about 132.0 grams 24% aqueous taurine sodium solution is added to a solution of about 268 grams of polyurethane mass A in about 800 ml. acetone. The reaction mixture is kept at about 60° C. for about 2 hours. The organic polyurethane solution has become hydrophilic by modification. It is diluted with about 800 ml. water.

EXAMPLE 6

The procedure according to Example 5 is carried out but with the use of a mixture of about 12.1 grams or amido sulphonic acid, about 70 ml. of 10% potassium hydroxide solution and about 12.5 grams of 30% aqueous formaldehyde solution in about 50 ml. of water. After removal of part of the solvent by distillation, about 700 ml. of water are added.

EXAMPLE 7

The procedure according to Example 1 is carried out but the mixture is prepared from about 12.5 grams aqueous formaldehyde solution and about 15.8 grams sodium sulphite in about 50 ml. of water. The mixture heated to about 50° C. for about 30 minutes is added with stirring to the polyurethane mass. The reaction mixture is heated for about 5 hours at about 50° C.

and concentrated by removal of about 200 ml. of tertiary butanol by distillation. By the addition of about 700 ml. of water, the organic polyurethane solution is converted into an aqueous organic latex, which is compatible with ammonia owing to its anionic character.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. The process of preparing water dispersible polyurethanes which comprises reacting a polyurethane having a molecular weight of from about 5000 to about 2,000,000 with an aliphatic aldehyde having up to 5 carbon atoms, an aromatic aldehyde having up to 7 carbon atoms, salicyclic aldehyde, vanilline or hexahydrobenzaldehyde and an alkali metal sulfite, alkali metal hydrosulfite, alkali metal amino carboxylate or alkali metal sulfonate at a temperature of from about 0° C. to about 150° C., the molar ratio of the aldehyde to alkali metal compound being in the range of 2:1 to 1:2, the pH of the reaction mixture being above about 7.

2. The product of the process of claim 1.

3. The process of claim 1 wherein said reaction with the polyurethane and the aldehyde is carried out in a first stage and the reaction of the resulting product with the metal sulphite, metal hydrosulphite, metal aminocarboxylate or metal aminosulphonate is carried out at a temperature of from about 0° C. to about 150° C. in a subsequent step.

4. The process of claim 1 wherein said aldehyde is formaldehyde and said metal is lithium, sodium or potassium.

5. The method of claim 1 wherein said aldehyde is formaldehyde said metal sulphite is lithium, sodium or potassium sulphite and said polyurethane is prepared by a process which comprises reacting an organic polyisocyanate with a polyester having a molecular weight of from about 200 to about 4,000 and prepared by a process which comprises reacting an excess of a dihydric alcohol with dicarboxylic acid.

6. The process of claim 1 wherein said metal is sodium and said aldethyde is formaldehyde.

References Cited
UNITED STATES PATENTS

| | | |
|---|---|---|
| 2,424,885 | 7/1847 | Buist et al. |
| 3,053,778 | 9/1962 | Toone. |
| 3,193,525 | 7/1965 | Kallert. |

WILLIAM H. SHORT, *Primary Examiner.*

L. M. PHYNES, *Assistant Examiner.*

U.S. Cl. X.R.

260—75, 77.5, 29.2, 29.3, 29.4, 29.6